(12) United States Patent
Wu

(10) Patent No.: US 8,350,825 B2
(45) Date of Patent: Jan. 8, 2013

(54) TOUCH PANEL AND TOUCHING POINT DETECTION METHOD THEREOF

(75) Inventor: Tsang-Chih Wu, Yilan County (TW)

(73) Assignee: ITE Tech. Inc., Hsinchu (TW)

( * ) Notice: Subject to any disclaimer, the term of this patent is extended or adjusted under 35 U.S.C. 154(b) by 513 days.

(21) Appl. No.: 12/619,640

(22) Filed: Nov. 16, 2009

(65) Prior Publication Data

US 2011/0074726 A1    Mar. 31, 2011

(30) Foreign Application Priority Data

Sep. 25, 2009   (TW) .............................. 98132452 A

(51) Int. Cl.
*G06F 3/045* (2006.01)
(52) U.S. Cl. ...................................................... 345/174
(58) Field of Classification Search ........................ None
See application file for complete search history.

(56) References Cited

U.S. PATENT DOCUMENTS

2007/0229470 A1* 10/2007 Snyder et al. .................. 345/173
2008/0170046 A1* 7/2008 Rimon et al. .................. 345/174

FOREIGN PATENT DOCUMENTS

CN    101493742        7/2009
CN    101493742 A  *   7/2009

OTHER PUBLICATIONS

"First Office Action of China Counterpart Application", issued on Jan. 5, 2012, p. 1-p. 4, in which the listed reference was cited.

* cited by examiner

*Primary Examiner* — Jason Olson
(74) *Attorney, Agent, or Firm* — Litron Patent and Trademark Office; Min-Lee Teng

(57) ABSTRACT

A touch panel is disclosed. The touch panel mentioned above includes at least a touching detection column and a touching detection module. The detection column includes N first touching detection units, N is a positive integer. Each of the first touching detection units transfers a first capacitance varying value according to an area cover by a touching point. The touching detection module operates a differential operating on the first capacitance varying values from two of the first touching detection units which is disposed adjoining in sequential for obtaining a capacitance varying order distribution. The touching detection module obtains a number of at least one first touching point and coordinates thereof by calculating the capacitance varying order distribution.

16 Claims, 4 Drawing Sheets

TOUCH PANEL AND TOUCHING POINT DETECTION METHOD THEREOF

CROSS-REFERENCE TO RELATED APPLICATION

This application claims the priority benefit of Taiwan application serial no. 98132452, filed on Sep. 25, 2009. The entirety of the above-mentioned patent application is hereby incorporated by reference herein and made a part of specification.

BACKGROUND OF THE INVENTION

1. Field of the Invention

The invention relates to a touch panel, and more particularly, to a touching point detection method thereof.

2. Description of Related Art

With the advancement in electronic techniques, consumers' demands on quality and functions of electronic products have increased as well. In order to attract the consumers by making the operation of these electronic products more convenient, various humanized human-machine interfaces have been proposed.

In the various human-machine interfaces, the most common interface is the so-called touch panel. The touch panel is a device capable of receiving input signals such as contacts (i.e. fingers, stylus, and etc.) and the like. When the user's finger touches the touch panel, the touch sensor on the panel transmits back an electrical signal generated correspondingly. The touch signal is then utilized to determine the corresponding actions performed by the user on the touch panel.

In a conventional capacitive touch panel, the number and the coordinates of the touching point are directly detected according to the capacitive varying value transmitted by the touch units disposed thereon. However, in the practical application, noises always cause various affects. Thus, in a conventional touch panel, many complicated circuit devices have to be disposed to reduce the noise in the environment, thereby increasing the manufacturing cost. Moreover, the forces the users exerted when touching on the touch panel are not the same, so the differentiation generated by different users is not often considered. Hence, conventional touch panels usually result in many inaccuracies when detecting the number of the touching point and the coordinates thereof.

SUMMARY OF THE INVENTION

The invention is directed to a touch panel configured to detect a number of a touching point accurately and positioning a location of the touching point.

The invention is further directed to a method of detecting a touching point on a touch panel, and the method is configured to accurately detect a number of the touching point and positioning a location of the touching point.

The invention provides a touch panel including at least one touching detection column and a touching point detection module. The touching detection column includes N first touching detection units, where N is a positive integer. Each first touching detection unit transmits a first capacitance varying value according to an area covered by a touching point. The touching point detection module is coupled to the first touching detection units to operate a subtractive operation on a plurality of first capacitance varying values transmitted by two adjacent first touching detection units according to an arrangement order of the first touching detection units. Consequently, a first capacitance varying order distribution is obtained. The touching point detection module obtains a number of at least one first touching point on the touch panel and coordinates of the first touching point according to the first capacitance varying order distribution.

According to an embodiment of the invention, the touching point detection module subtracts the first capacitance varying value transmitted by an $(i+1)^{th}$ first touching detection unit from the first capacitance varying value transmitted by an $i^{th}$ first touching detection unit according to the arrangement order of the first touching detection units to perform the subtractive operation. Moreover, the touching point detection module subtracts the first capacitance varying value transmitted by an $(i-1)^{th}$ first touching detection unit from the first capacitance varying value transmitted by the $i^{th}$ first touching detection unit to perform the subtractive operation, where i is an even number.

According to an embodiment of the invention, the touching point detection module subtracts the first capacitance varying value transmitted by the $(i+1)^{th}$ first touching detection unit from the first capacitance varying value transmitted by the $i^{th}$ first touching detection unit according to the arrangement order of the first touching detection units to perform the subtractive operation. Moreover, the touching point detection module subtracts the first capacitance varying value transmitted by an $(i-1)^{th}$ first touching detection unit from the first capacitance varying value transmitted by the $i^{th}$ first touching detection unit to perform the subtractive operation, where i is an odd number.

According to an embodiment of the invention, the touching point detection module subtracts the first capacitance varying value transmitted by the $(i+1)^{th}$ first touching detection unit from the first capacitance varying value transmitted by the $i^{th}$ first touching detection unit according to the arrangement order of the first touching detection units to operate the subtractive operation, where i is a positive integer.

According to an embodiment of the invention, the touching point detection module obtains a plurality of symbol results and a plurality of absolute differences according to the subtractive operation.

According to an embodiment of the invention, the touching point detection module further determines whether each of the absolute differences and each corresponding symbol result are recorded to the first capacitance varying order distribution according to a comparison result of each of the absolute differences and a threshold.

According to an embodiment of the invention, the touching point detection module obtains the number of the first touching point according to the symbol results in the first capacitance varying order distribution.

According to an embodiment of the invention, the touching point detection module obtains the coordinates of the first touching point according to the consecutive absolute differences in the first capacitance varying order distribution.

According to an embodiment of the invention, the touch panel further includes at least one touching detection row. The touching detection row is coupled to the touching point detection module. The touching detection row includes M second touching detection units. Each second touching detection unit transmits a second capacitance varying value according to an area covered by the touching point, wherein M is a positive integer.

According to an embodiment of the invention, the touching point detection module operates the subtractive operation on the second capacitance varying values transmitted by two adjacent second touching detection units according to an arrangement order of the second touching detection units to obtain a second capacitance varying order distribution. The touching point detection module obtains a number of the second touching point on the touch panel and coordinates of the second touching point according to the second capacitance varying order distribution.

According to an embodiment of the invention, the touching point detection module further determines whether each of the absolute differences and each corresponding symbol result are recorded to the second capacitance varying order distribution according to a comparison result of each of the absolute differences and a threshold.

According to an embodiment of the invention, the touching point detection module obtains the number of the second touching point according to a number of times consecutively showing the symbol results in the second capacitance varying order distribution.

According to an embodiment of the invention, the touching point detection module obtains the coordinates of the second touching point according to the consecutive absolute differences in the second capacitance varying order distribution.

The invention is further directed to a method of detecting a touching point on a touch panel. The method includes the following. Firstly, a plurality of first touching detection units is provided and therefore arranged into at least one touching detection column. A touching point detection module is provided to operate a subtractive operation on a plurality of first capacitance varying values transmitted by two adjacent first touching detection units according to an arrangement order of the first touching detection units. As a consequence, a first capacitance varying order distribution is obtained. Finally, the touching point detection module is provided to obtain a number of at least one first touching point on the touch panel and coordinates of the first touching point according to the first capacitance varying order distribution.

In light of the foregoing, the subtractive operation is operated by using the capacitance varying values transmitted by adjacent touching detection units in the same touching detection column or the same touching detection row. In addition, the number of the touching point and the coordinates of the touching point are determined according to the distribution of the symbol results obtained from the subtractive operation. Furthermore, the absolute differences obtained from the subtractive operation are applied to compensate the calculated coordinates of the touching point, so that the coordinates of the touching point can be marked more accurately.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
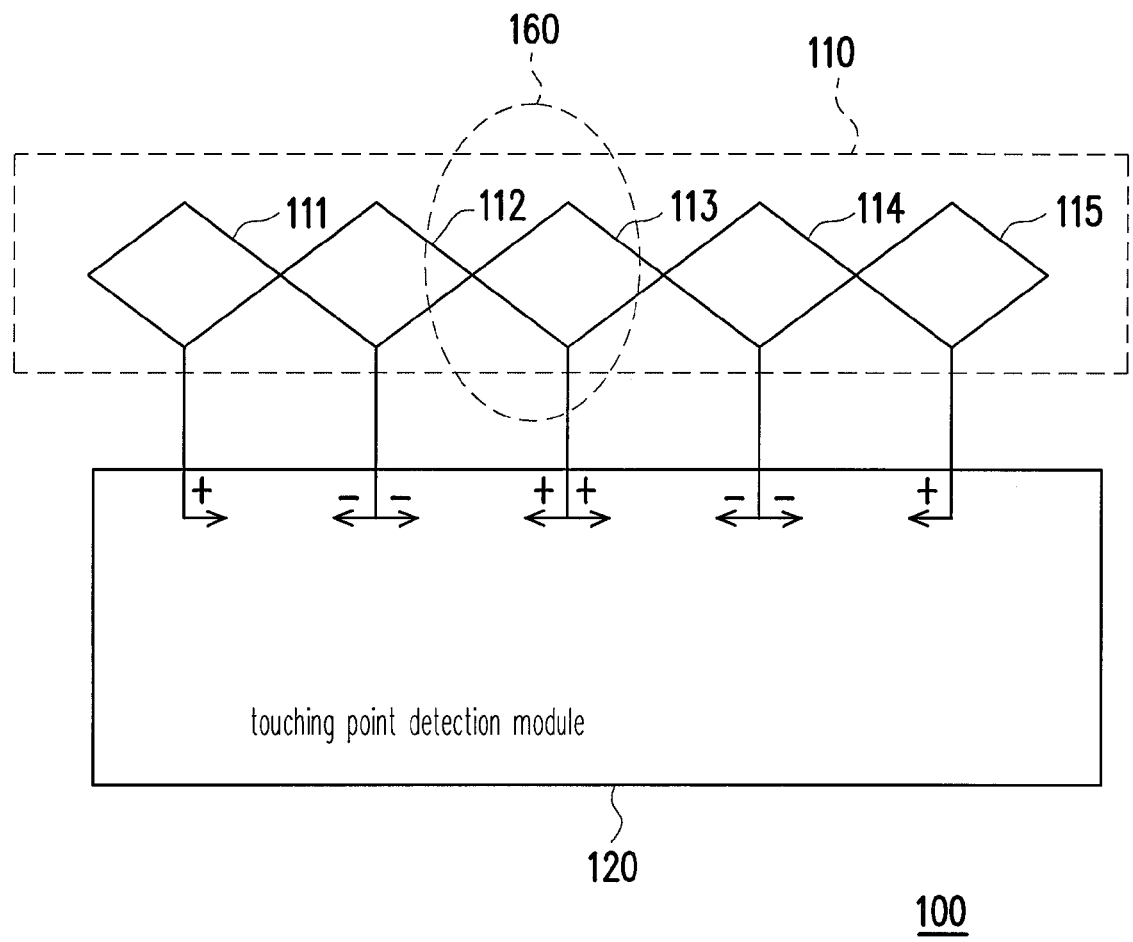
FIG. 1A is a schematic view illustrating a touch panel 100 according to an embodiment of the invention.

Referring to FIG. 1A, FIG. 1A is a schematic view illustrating a touch panel 100 according to an embodiment of the invention. The touch panel 100 includes a touching detection column 110 having a plurality of touching detection units 111~115 and a touching point detection module 120. Each of the touching detection units transmits a corresponding capacitance varying value according to an area covered by a touching point.

The touching point detection module 120 is coupled to the touching detection column 110. When the touching point detection module 120 detects the touching point on the touching detection column 110, the touching point detection module 120 operates a subtractive operation on capacitance varying values transmitted by two adjacent touching detection units according to an arrangement order of the touching detection units 111~115. In other words, the touching point detection module 120 operates the subtractive operation on the capacitance varying values transmitted by the touching detection units 111, 112 according to an order from left to right as shown in FIG. 1. Afterwards, the touching point detection module 120 operates the subtractive operation on the capacitance varying values transmitted by the touching detection units 114, 115. Accordingly, the detection is performed until the subtractive operation has been operated on the capacitance varying values transmitted by two adjacent touching detection units within all of the touching detection units 111~115.

Obviously, the touching point detection module 120 also operates the subtractive operation in another order from right to left as shown in FIG. 1. That is, the subtractive operation is first operated on the capacitance varying values transmitted by the touching detection units 115, 114. Afterwards, the touching point detection module 120 operates the subtractive operation on the capacitance varying values transmitted by the touching detection units 114, 113. Here, when the touching point detection module 120 detects the touching point, the order of executing the subtractive operation is not limited.

Moreover, in the so-called subtractive operation, the touching point detection module 120 performs subtraction on the capacitance varying values transmitted by two adjacent touching detection units. In other words, the touching point detection module 120 subtracts the capacitance varying value transmitted by the touching detection unit 112 from the capacitance varying value transmitted by the touching detection unit 111. Next, the touching point detection module 120 subtracts the capacitance varying value transmitted form the touching detection unit 112 from the capacitance varying value transmitted by the touching detection unit 113. Accordingly, the touching point detection module 120 sequentially executes multiple subtractive operations aforementioned. Moreover, each subtractive operation result is recorded according to an order of executions to obtain a capacitance varying order distribution.

The touching point detection module 120 can also subtracts the capacitance varying value transmitted by the touching detection unit 111 from the capacitance varying value transmitted by the touching detection unit 112. Afterwards, the touching point detection module 120 subtracts the capacitance varying value transmitted by the touching detection unit 113 from the capacitance varying value transmitted by the touching detection unit 112. Accordingly, multiple subtractive operations are executed in sequence to obtain the capacitance varying order distribution.

That is, the touching point detection module 120 sets the capacitance varying values that are transmitted by the even number touching detection units 112, 114 in the touching detection column 110 to be the subtrahend in the subtractive operation. In addition, the capacitance varying values that are transmitted by the odd number touching detection units 111, 113, 115 in the touching detection column 110 are set to be the minuend in the subtraction. Alternatively, the capacitance varying values that are transmitted by the odd number touching detection units 111, 113, 115 in the touching detection column 110 are set to be the subtrahend in the subtractive operation. Additionally, the capacitance varying values that are transmitted by the even number touching detection units 112, 114 in the touching detection column 110 are set to be the minuend in the subtraction.

It should be noted that a symbol result and an absolute difference are produced in every subtractive operation aforementioned. When the capacitance varying value transmitted by the touching detection unit set to be the minuend (i.e. the touching detection unit 111) is larger than the capacitance varying value transmitted by the touching detection unit set to be the subtrahend (i.e. the touching detection unit 112), the symbol result generated from the subtractive operation is "+". On the contrary, in the case mentioned above, when the capacitance varying value transmitted the touching detection unit 111 is smaller than the capacitance varying value transmitted by the touching detection unit 112, which is set to be the subtrahend, the symbol result generated from the subtractive operation is "−". The absolute difference is an absolute value of the difference between the capacitance varying values of the touching detection units 111, 112. Further, when operating the subtractive operation, the touching point detection module 120 compares the calculated absolute difference with a predetermined threshold. When the absolute difference is smaller than the threshold, the touching point detection module 120 forsakes the result generated from this subtractive operation. When the absolute difference is larger than or equal to the threshold, the touching point detection module 120 records the symbol result and the absolute difference generated from the subtractive operation into the capacitance varying order distribution. The threshold is set to prevent the capacitance varying value transmitted by the touching detection unit from being affected by environmental noise, which leads to an erroneous touching point. For example, in the illustration of FIG. 1, the range of a touching point 160 includes a small portion of touching detection unit 112 and most of the touching detection unit 113. The touching detection units 114, 115 are not covered at all. Theoretically, the capacitance varying values transmitted by the touching detection units 114, 115 should both be 0. However, without setting the threshold, when the touching detection unit 115 generates a capacitance varying value larger than 0 due to the interference of environmental noise, the symbol result and the absolute difference generated from the subtractive operation of the touching detection units 114, 115 are not 0, thereby affecting the result of the detection.

The threshold can be set in accordance to actual usage and environment. When the detection of the touch panel is expected to be more sensitive, a lower threshold can be set in an environment with less interference. Oppositely, when the detection of the touch panel is expected to be more constant, a higher threshold can be set in an environment with more interference. An exemplary example is shown in the following to illustrate the operation of the touch panel 100 in the present embodiment. Referring to FIG. 1, the range of the touching point 160 includes a small portion of the touching detection unit 112 and most of the touching detection unit 113. Additionally, the touching detecting units 111, 113, 115 are set to minuend and the touching detecting units 112, 114 are set to be subtrahend. The touching point detection module 120 operates the subtractive operation from right to left in sequence. Firstly, the touching point detection module 120 operates the subtractive operation on the touching detection units 111, 112, and a symbol result obtained is "−". Thereafter, the touching point detection module 120 operates the subtractive operation on the touching detection units 112, 113. Since an area covered by the touching detection unit 113 is larger than an area covered by the touching detection unit 112, the symbol result here is "+". Next, the touching point detection module 120 operates the subtractive operation on the touching detection units 113, 114 and consequently obtains a symbol result of "+". Since the touching detection units 114, 115 are not covered, the capacitance varying values thereof do not exceed the threshold. Thus, the symbol result obtained from the subtractive operation on the touching detection units 114, 115 is 0.

It should be noted that when a bit is used to record the symbol result of the subtractive operation of two adjacent touching detection units, "1" is utilized to represent the symbol result "+" and "0" is used to represent the symbol result "−". Alternatively, "1" can be utilized to represent the symbol result "−" while "0" is used to represent the symbol result "+". However, since a bit can not generate a third level to represent the symbol result "0", "1" or "0" can be set to permanently represent the symbol result "0".

Therefore, in the present embodiment, the capacitance varying order distribution has symbol results of "−" "+" "+" "0". Here, "0" means the symbol result of this subtractive operation is not recorded into the capacitance varying order distribution. From the capacitance varying order distribution, it is observed that a continuous symbol result ("−" "+" "+") is present under the condition of this embodiment. Accordingly, the touching point detection module 120 determines the touch panel 100 of the present embodiment to include a touching point.

From the illustrations aforementioned, when a plurality of touching points touches a touching apparatus 100, the capacitance varying order distribution then shows changes in the continuous symbol results ("+" or "−") that are equivalent to the numbers of touching points. The touching point detection module 120 can also obtain the numbers of more than one touching points according to the capacitance varying order distribution.

Obviously, the touching detection units covered by the touching point 160 are also obtained by utilizing the capacitance varying order distribution. In addition, with the principle that the larger the area of the touching detection units covered by the touching point 160, the larger the transmitted capacitance varying value is, a plurality of absolute differences in the capacitance varying order distribution is used to calculate the accurate coordinates of the touching point 160.

Figure 1B:
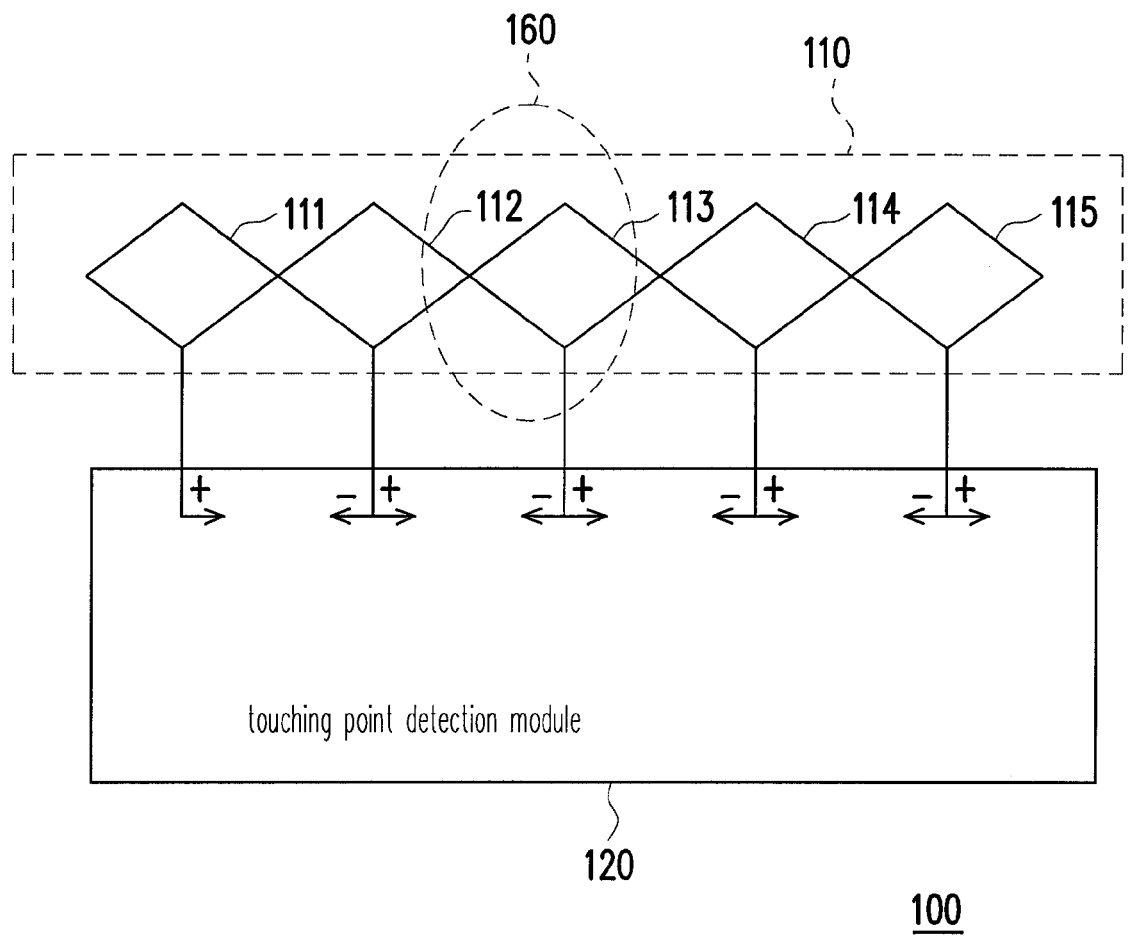
FIG. 1B illustrates another exemplary embodiment of the touch panel 100.

Referring to FIG. 1B, FIG. 1B illustrates another exemplary embodiment of the touch panel 100. In the illustration in FIG. 1B, the subtractive operations of the capacitance varying values transmitted by two adjacent touching detection units are different from those illustrated in FIG. 1A. When the subtractive operation is operated on the touching detection units 112, 113 in FIG. 1B, the capacitance varying value of the touching detection unit 113 is subtracted from the capacitance varying value of the touching detection unit 112. That is, in the present embodiment, the capacitance varying value of the latter touching detection unit of two adjacent touching detection units is subtracted from the capacitance varying value of the former touching detection unit to complete the subtractive operation.

From the illustrations in FIG. 1A and FIG. 1B, the subtrahend and the minuend of two adjacent touching detection units in the subtractive operation are not limited in the invention. The subtractive operations operated on the capacitance varying values transmitted by two adjacent touching detection units all belong within the protection range of the invention.

Figure 2:
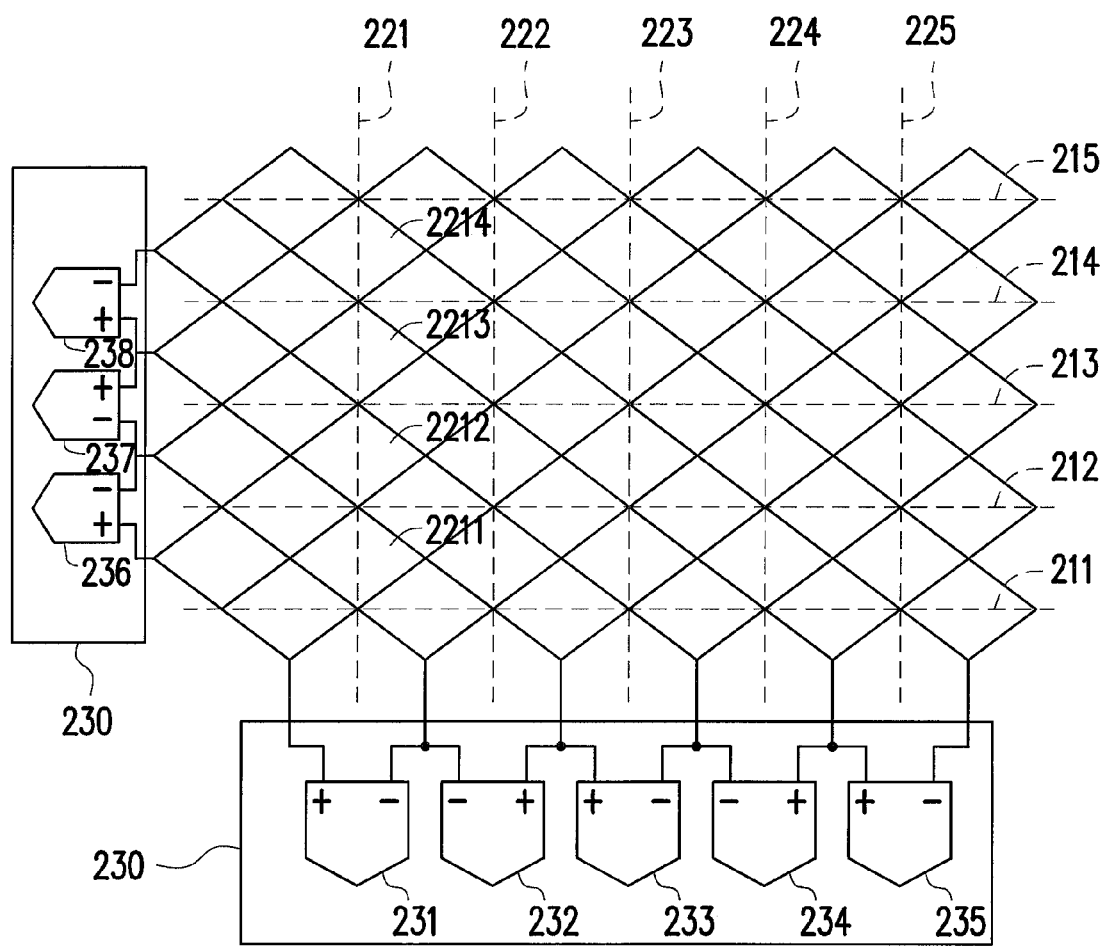
FIG. 2 is a schematic view illustrating a touch panel 200 according to another embodiment of the invention.

Referring to FIG. 2, FIG. 2 is a schematic view illustrating a touch panel 200 according to another embodiment of the invention. The touch panel 200 includes a plurality of touching detection columns disposed along axes 211, 212, 213, 214, and 215, and a plurality of touching detection rows disposed along axes 221, 222, 223, 224, and 225. The exemplary embodiments of the touching detection column and the touching detection column 110 illustrated in FIG. 1 are the same. The touching detection row and the touching detection column are disposed in perpendicular to each other. Take the touching detection row disposed along the axis 221 as an example, the touching detection row includes touching detection units 2211, 2212, 2213, and 2214.

A touching point detection module 230 is coupled to all of the touching detection rows and touching detection columns. Here, the touching point detection module 230 operates the subtractive operation on each adjacent touching detection unit of each touching detection row to obtain the corresponding capacitance varying order distribution. Next, the touching point detection module 230 operates the subtractive operation on each adjacent touching detection unit of each touching detection column to obtain the corresponding capacitance varying order distribution. On the other hand, the touching point detection module 230 can first operate the subtractive operation on each adjacent touching detection unit of each touching detection column to obtain the corresponding capacitance varying order distribution, and then operate the subtractive operation on each adjacent touching detection unit of each touching detection row to obtain the corresponding capacitance varying order distribution. The operating method of the subtractive operation on the touching detection row is the same as the exemplary embodiment of the subtractive operation on the touching detection column, and is thus not repeated herein.

That is, since the touching detection row and the touching detecting column both have touching detection units that are independent to one another, the touch panel 200 can obtain coordinates of the touching point in the perpendicular axis and horizontal axis to attain the ability of two-dimensional positioning.

It should be noted that in the present embodiment, the touching point detection module 230 includes a plurality of difference calculators 231~238 for respectively calculating differences in capacitance varying values of adjacent touching detection units in different touching detection rows and touching detection columns. Since the touching point detection module 230 only calculates the difference in capacitance varying values of two adjacent touching detection units at a time, only one difference calculator may be used. Moreover, the subtractive operation is performed by selecting the capacitance varying values of adjacent touching detection units to be calculated during a plurality of different timing periods through a multiplexer.

Figure 3:
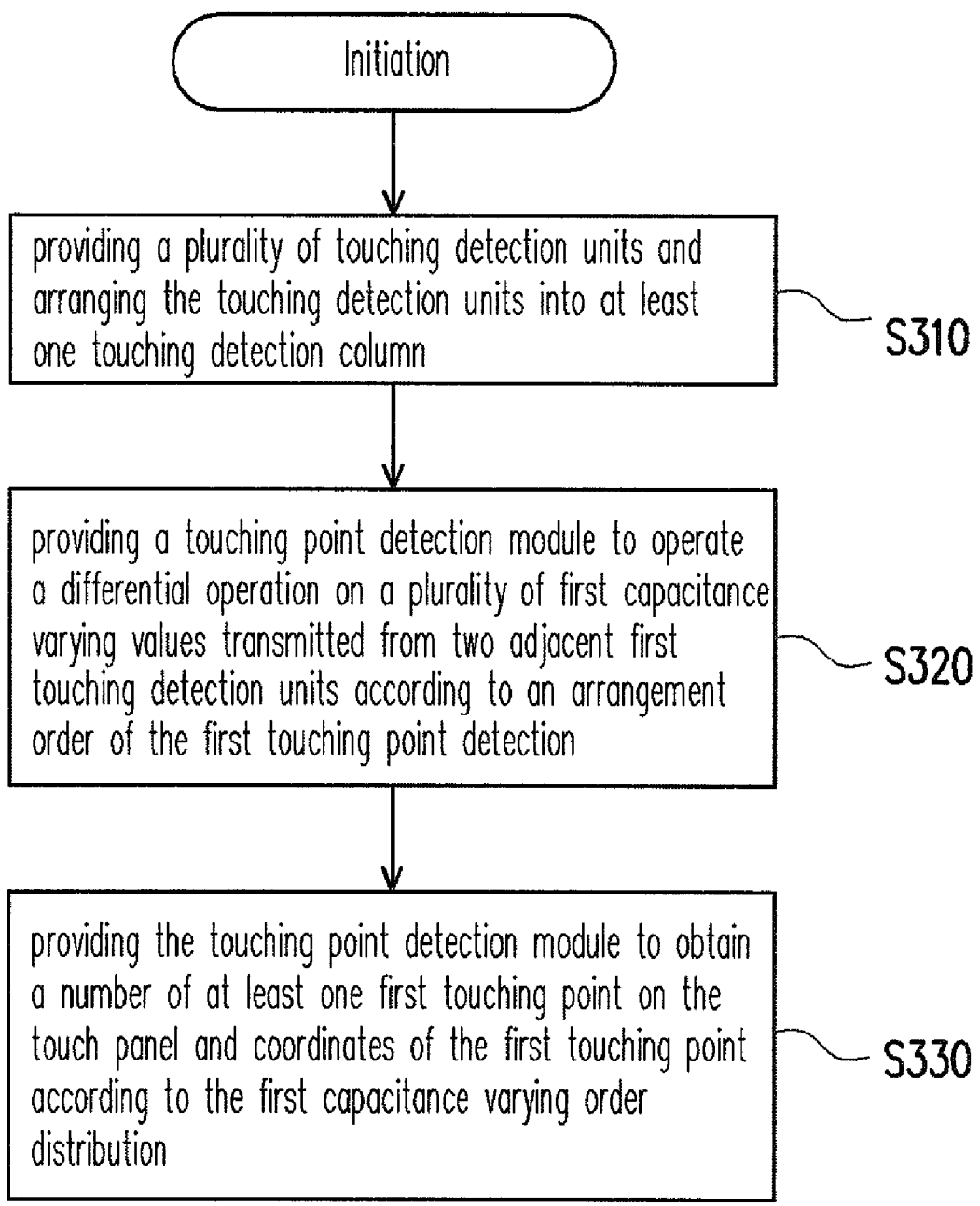
FIG. 3 is a flowchart illustrating a method of detecting a touching point on a touch panel according to an embodiment of the invention.

Referring to FIG. 3, FIG. 3 is a flowchart illustrating a method of detecting a touching point on a touch panel according to an embodiment of the invention. The method includes the following. Firstly, a plurality of first touching detection units is provided and arranged into at least one touching detection column (S310). Next, a touching point detection module is provided to operate a subtractive operation on a plurality of first capacitance varying values transmitted by two adjacent first touching detection units according to an arrangement order of the first touching detection units. As a consequence, a first capacitance varying order distribution is obtained (S320). Finally, the touching point detection module is provided to obtain a number of at least one first touching point on the touch panel and coordinates of the first touching point according to the first capacitance varying order distribution (S330). The operation details of the method of detecting the touching point of the touch panel in the embodiment of the invention are illustrated in the different embodiments illustrated in FIGS. 1A, 1B, and 2, and thus are not repeated hereinafter.

In summary, in the invention, the subtractive operation is sequentially operated on the capacitance varying values of two adjacent touching detection units in each touching detection column and each touching detection row so as to generate the capacitance varying order distribution. Furthermore, the number and the relative position of the touching points are determined according to the number of continuous symbol results in the capacitance varying order distribution. In addition, the coordinates of the touching point are positioned accurately with the absolute differences in the capacitance varying order distribution.

Although the invention has been described with reference to the above embodiments, it is apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch panel, comprising:
   at least one touching detection column, each touching detection column comprising:
      a plurality of column touching detection units, each of the plurality of column touching detection units generates a column capacitance varying value according to a measure of an area covered by a contact; and
      a touching point detection module, coupled to the plurality of column touching detection units, operating a subtractive operation on the column capacitance varying values of each two adjacent column touching detection units to obtain a first capacitance varying order distribution, and obtaining a number of and coordinates of more than one of the plurality of column touching detection units which are covered by the contact according to the first capacitance varying order distribution.

2. The touch panel as claimed in claim 1, wherein the touching point detection module obtains a plurality of symbol results and a plurality of absolute differences according to the subtractive operation.

3. The touch panel as claimed in claim 2, wherein the touching point detection module further determines whether each of the plurality of absolute differences and each corresponding symbol result are recorded into the first capacitance varying order distribution according to a comparison result of each of the plurality of absolute differences and a threshold.

4. The touch panel as claimed in claim 2, wherein the touching point detection module obtains the number of the more than one of the plurality of column touching detection units which are covered by the contact according the plurality of symbol results in the first capacitance varying order distribution.

5. The touch panel as claimed in claim 2, wherein the touching point detection module obtains the coordinates of the more than one of the plurality of column touching detection units which are covered by the contact according to the plurality of consecutive absolute differences in the first capacitance varying order distribution.

6. The touch panel as claimed in claim 1, further comprising: at least one touching detection row, coupled to the touching point detection module, each touching detection row comprising:
a plurality of row touching detection units, each of the plurality of row touching detection units generates a row capacitance varying value according to the measure of the area covered by the contact.

7. The touch panel as claimed in claim 6, wherein the touching point detection module operates the subtractive operation on the row capacitance varying values of each two adjacent row touching detection units according to an arrangement order of the plurality of row touching detection units to obtain a second capacitance varying order distribution, and obtains a number of and coordinates of more than one of the plurality of row touching detection units which are covered by the contact according to the second capacitance varying order distribution.

8. The touch panel as claimed in claim 7, wherein the touching point detection module obtains a plurality of symbol results and a plurality of absolute differences according to the subtractive operation.

9. The touch panel as claimed in claim 8, wherein the touching point detection module further determines whether each of the plurality of absolute differences and each corresponding symbol result are recorded to the second capacitance varying order distribution according to a comparison result of each of the plurality of absolute differences and a threshold.

10. The touch panel as claimed in claim 8, wherein the touching point detection module obtains the number of the more than one of the plurality of row touching detection units which are covered by the contact according to the plurality of symbol results in the second capacitance varying order distribution.

11. The touch panel as claimed in claim 8, wherein the touching point detection module obtains the coordinates of the more than one of the plurality of row touching detection units which are covered by the contact according to the plurality of absolute differences in the second capacitance varying order distribution.

12. A method of detecting a contact on a touch panel, comprising the steps of:
a. providing a plurality of touching detection units and arranging the plurality of touching detection units into at least one touching detection column;
b. operating a subtractive operation on capacitance varying values generated by each two adjacent touching detection units according to an arrangement order of the plurality of touching detection units and therefore obtaining a first capacitance varying order distribution; and
c. obtaining a number of and coordinates of more than one of the plurality of touching detection units which are covered by the contact according to the first capacitance varying order distribution.

13. The method as claimed in claim 12, wherein the step b further comprises obtaining a plurality of symbol results and a plurality of absolute differences according to the subtractive operation.

14. The method as claimed in claim 13, wherein the step b further comprises determining whether each of the plurality of absolute differences and each corresponding symbol result are recorded to the first capacitance varying order distribution according to a comparison result of each of the plurality of absolute differences and a threshold.

15. The method as claimed in claim 13, wherein obtaining the number of the more than one of the plurality of touching detection units which are covered by the contact in the step b is according to the plurality of symbol results in the first capacitance varying order distribution.

16. The method as claimed in claim 13, wherein obtaining the coordinates of the more than one of the plurality of touching detection units which are covered by the contact in the step b is according to the plurality of consecutive absolute differences in the first capacitance varying order distribution.

* * * * *